(12) United States Patent
Furuta

(10) Patent No.: US 8,196,443 B2
(45) Date of Patent: Jun. 12, 2012

(54) METHOD OF CORRECTING HEAD SUSPENSION, METHOD OF MANUFACTURING HEAD SUSPENSION, HEAD SUSPENSION, AND METHOD OF PROCESSING THIN PLATE

(75) Inventor: Eijiro Furuta, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 688 days.

(21) Appl. No.: 12/321,649

(22) Filed: Jan. 23, 2009

(65) Prior Publication Data

US 2009/0185460 A1 Jul. 23, 2009

(30) Foreign Application Priority Data

Jan. 23, 2008 (JP) ................................. 2008-013159

(51) Int. Cl.
*B21D 37/16* (2006.01)

(52) U.S. Cl. .......... 72/16.2; 72/16.3; 72/21.4; 72/342.1; 72/342.94; 72/405.04; 72/420

(58) Field of Classification Search .................. 72/8, 11, 72/16.2, 16.3, 21.4, 338, 342.1, 342.11, 342.94, 72/405.04, 420; 360/104, 235.8, 235.9, 245.7, 360/245.9, 245.8; 29/603.12
See application file for complete search history.

(56) References Cited

U.S. PATENT DOCUMENTS

| | | | | |
|---|---|---|---|---|
| 4,603,567 A | * | 8/1986 | Smith et al. ..................... | 72/16.9 |
| 5,739,982 A | * | 4/1998 | Arya et al. .................. | 360/234.5 |
| 5,832,763 A | * | 11/1998 | Girard ............................. | 72/16.3 |
| 7,275,408 B1 | * | 10/2007 | Balasubramaniam et al. ............................. | 72/342.1 |
| 7,330,338 B1 | * | 2/2008 | Wick et al. ................. | 360/245.7 |
| 2004/0125511 A1 | * | 7/2004 | Yang et al. ................. | 360/294.4 |
| 2009/0185460 A1 | * | 7/2009 | Furuta ........................ | 369/13.11 |
| 2009/0268326 A1 | * | 10/2009 | Shelor ............................. | 360/31 |
| 2010/0033874 A1 | * | 2/2010 | Furuta et al. .................. | 360/244 |
| 2010/0085663 A1 | * | 4/2010 | Ando et al. ................. | 360/244.2 |
| 2010/0208390 A1 | * | 8/2010 | Hanya et al. ................ | 360/245.2 |
| 2010/0259851 A1 | * | 10/2010 | Yao et al. .................... | 360/245.3 |
| 2011/0141624 A1 | * | 6/2011 | Fuchino et al. ............. | 360/244.2 |
| 2011/0216446 A1 | * | 9/2011 | Iriuchijima ................ | 360/294.4 |

FOREIGN PATENT DOCUMENTS

| | | |
|---|---|---|
| JP | 2-252179 | 10/1990 |
| JP | 2000-339894 | 12/2000 |
| JP | 2002-93092 | 3/2002 |
| JP | 2004-82161 | 3/2004 |
| JP | 2006-269018 | 10/2006 |
| JP | 2007-051710 | 3/2007 |

* cited by examiner

Primary Examiner — David Jones
(74) Attorney, Agent, or Firm — Jordan and Hamburg LLP

(57) ABSTRACT

A method corrects a head suspension by irradiating an objective part of the head suspension with a laser beam. The method is capable of precisely correcting the head suspension even when correcting the head suspension a plurality of times.

The method removes residual stress created by the preceding correction from the head suspension, and then, carries out the next correction. Accordingly, the method can precisely correct the objective part of the head suspension with a laser beam even if the objective part has once been irradiated with a laser beam in the preceding correction.

8 Claims, 9 Drawing Sheets

1st step: Correcting bend with laser beam

2nd step: Removing stress

Fig.9(1) Example of correction by laser irradiation
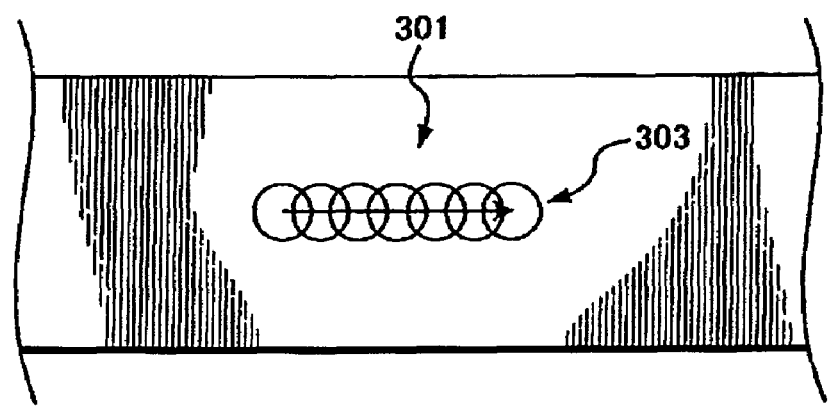
Fig.9(2) Laser irradiation history
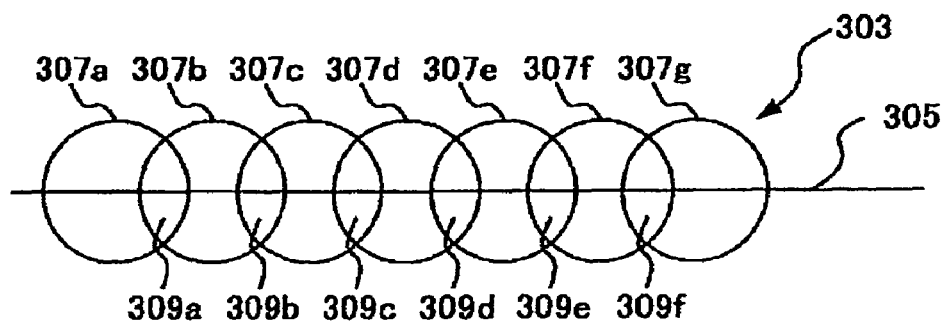

METHOD OF CORRECTING HEAD SUSPENSION, METHOD OF MANUFACTURING HEAD SUSPENSION, HEAD SUSPENSION, AND METHOD OF PROCESSING THIN PLATE

BACKGROUND OF THE INVENTION

1. Field of the Invention

The present invention relates to a method of correcting the load or attitude angle of a head suspension that supports a magnetic head slider in a hard disk drive, a method of manufacturing such a head suspension, the head suspension itself, and a method of processing a thin plate. In particular, the present invention relates to a method of correcting a head suspension, capable of precisely correcting the load or attitude angle of the head suspension even when correcting the head suspension a plurality of times, a method of manufacturing a head suspension with the use of the correcting method, the head suspension thus manufactured, and a thin plate processing method employing the correcting method.

2. Description of Related Art

The recording density of hard disk drives has drastically improved in recent years, and accordingly, a precision requirement for head suspensions for supporting magnetic heads in the hard disk drives is becoming severer. The head suspension is designed to apply a predetermined load onto a magnetic head attached thereto and allow the magnetic head aerodynamically rise by a predetermined distance from a disk in a hard disk drive when the disk is turned at high speed. The attitude of the magnetic head in the risen state is greatly influenced by the load, roll angle, and pitch angle of the head suspension, and therefore, the load, roll angle, and pitch angle of every head suspension must correctly be adjusted during manufacturing. In this specification, the roll and pitch angles of a head suspension is collectively referred to as "attitude angle."

Generally, the load and attitude angle of a head suspension are corrected by holding an outrigger formed at a front end of a flexure of the head suspension and by mechanically displacing, bending, or twisting the outrigger. Mechanically holding and correcting the outrigger needs a jig specifically prepared for the outrigger and a long time to move the jig, hold the outrigger, and process the outrigger. Namely, correcting a head suspension generally involves many steps and a long time.

To cope with this, Japanese Unexamined Patent Application Publication No. 2000-339894 discloses a technique of irradiating a head suspension with a laser beam, to thermally deform the head suspension and thereby correct the load or attitude angle of the head suspension. The applicant of the present invention has disclosed in Japanese Unexamined Patent Application Publication No. 2004-82161 a technique of defining an irradiation area on a head suspension and irradiating the irradiation area with a laser beam, to draw a pattern of predetermined length and shape with the laser beam in the irradiation area and thereby correct the load and attitude angle of the head suspension. This technique bends an objective part of the head suspension by drawing a specific irradiation pattern in the objective part with a laser beam, thereby precisely correcting the load and attitude angle of the head suspension.

Precision requirement for head suspensions is continuously increasing and there is a strong need of manufacturing uniform head suspensions. To meet the requirement and need, a head suspension must sometimes be corrected a plurality of times until it attain a specified load or a specified attitude angle. For example, a head suspension once or several times corrected and still out of an allowable error range must be corrected again. There is a possibility that a magnetic head already assembled with a head suspension into a head gimbal assembly shows an error in a product test. In this case, the magnetic head must be removed from the head suspension and must be replaced with another and the head suspension must be again corrected before or after it is reassembled with the replaced magnetic head (Japanese Unexamined Patent Application Publication No. 2002-93092).

The inventor of the present invention has found that, when a head suspension is corrected a plurality of times with a laser beam in such a way that a succeeding correction traces a preceding correction, the head suspension will not accurately be corrected.

When a part of a head suspension is once irradiated with a laser beam, to correct the load or attitude angle of the head suspension, substantially no change will occur in the load and attitude angle of the head suspension when the same part is again irradiated with a laser beam. This is because correcting the load and attitude angle of a head suspension with a laser beam is based on a bend produced by a thermal stress difference between a surface of the head suspension irradiated with the laser beam and an opposite surface thereof not irradiated with the laser beam.

The part once heated with a laser beam will show little change in internal stress when irradiated with a laser beam second time. Any head suspension once corrected with a laser beam does not provide an intended bend when it is irradiated with a laser beam again. This is the reason why repetitive corrections conducted on a head suspension cause a correction error in the load and attitude angle of the head suspension.

There is, therefore, a requirement for a new technique capable of precisely correcting the load and attitude angle of a head suspension or a thin plate even when correcting the head suspension or thin plate a plurality of times. The correction error caused by repetitive bending actions occurs to any object without regard to whether or not a bend of the object is corrected by laser irradiation.

SUMMARY OF THE INVENTION

An object of the present invention is to provide a method of correcting a head suspension, a method of manufacturing a head suspension, a head suspension, and a method of processing a thin plate, capable of precisely correcting an objective item even when correcting the objective item a plurality of times.

In order to accomplish the object, an aspect of the present invention provides a method of correcting a head suspension before or after mounting a read/write head on the head suspension. The method includes repeating a correction process of correcting the head suspension due to bending a plurality of times and removing residual stress from the head suspension before each repetition of the correction process.

This aspect of the present invention removes residual stress of the head suspension created by this time of correction before starting the next time of correction, to precisely correct the load and attitude angle of the head suspension even when the same part of the head suspension is corrected a plurality of times.

BRIEF DESCRIPTION OF THE DRAWINGS

FIGS. 9(1) and 9(2) are explanatory views showing an example of a process of correcting a head suspension by irradiating the head suspension with a laser beam and bending the head suspension thereby, according to an embodiment of the present invention.

DETAILED DESCRIPTION OF EMBODIMENTS

A method of correcting a head suspension, a method of manufacturing a head suspension, a head suspension, and a method of processing a thin plate according to embodiments of the present invention will be explained in detail with reference to the drawings.

First, a head suspension correcting apparatus employed by the present invention will be explained.

Figure 1:
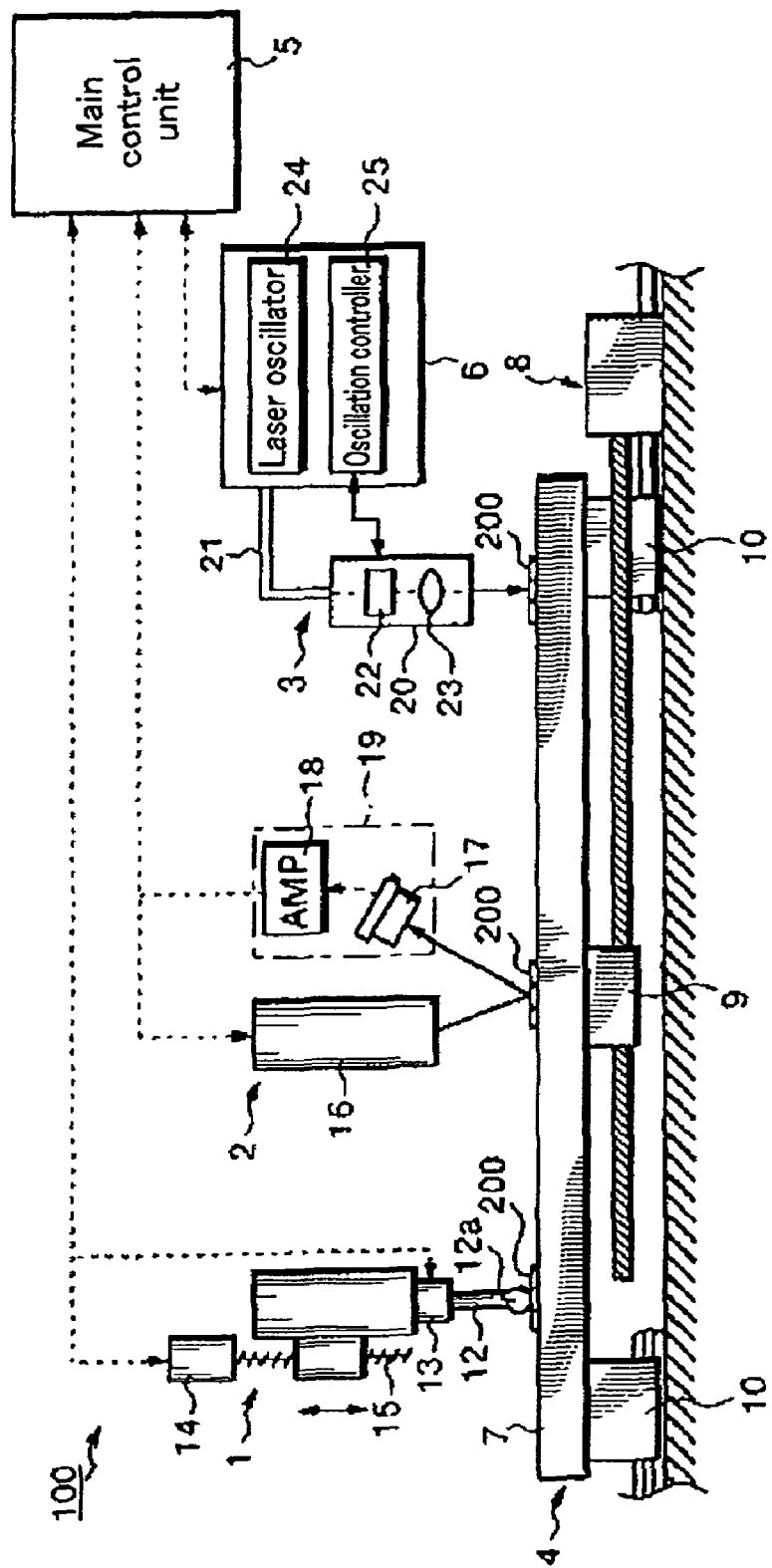
FIG. 1 is a general view showing a head suspension correcting apparatus employed by the present invention.
Figure 2:
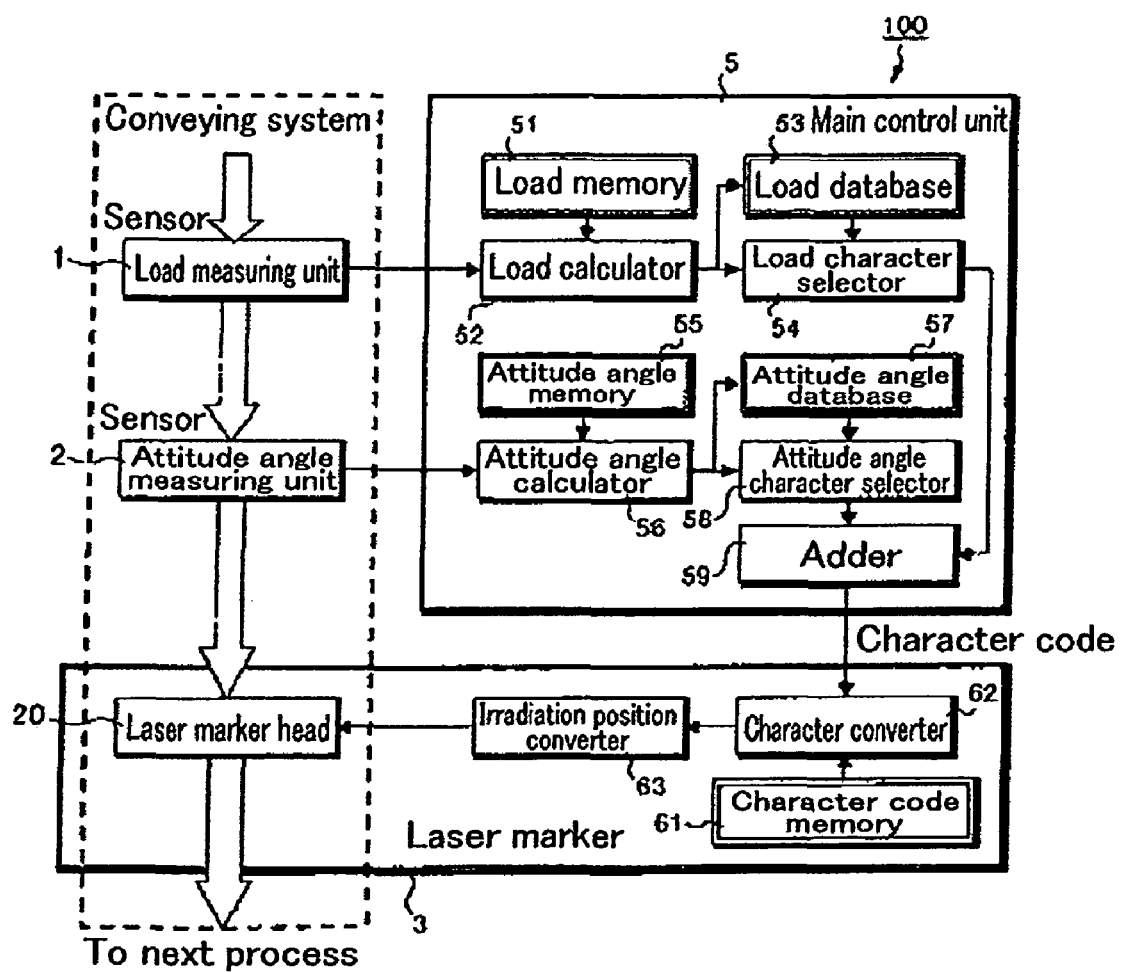
FIG. 2 is a functional block diagram showing the apparatus of FIG. 1.
Figure 3:
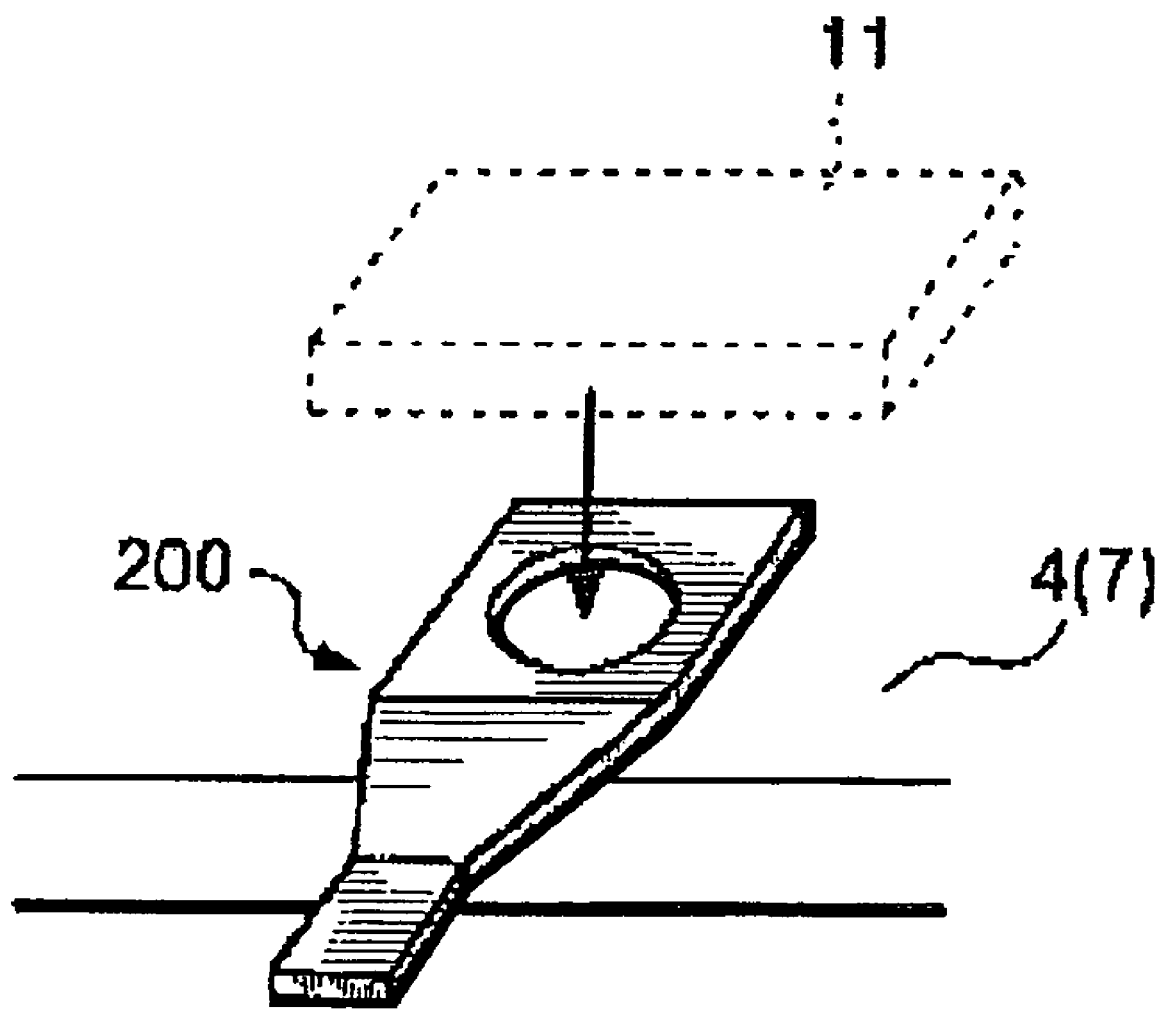
FIG. 3 is an explanatory view showing a head suspension set in the apparatus of FIG. 1, the head suspension being corrected according to the present invention.

FIG. 1 is a general view showing the head suspension correcting apparatus, FIG. 2 is a functional block diagram showing the apparatus of FIG. 1, and FIG. 3 is an explanatory view showing a head suspension set in the apparatus of FIG. 1, the head suspension being corrected according to the present invention.

In FIG. 1, the head suspension correcting apparatus 100 is employed to correct the load and attitude angle of a head suspension due to bending. The apparatus 100 includes a load measuring unit 1, an attitude angle measuring unit 2, a laser marker 3, a conveying unit 4, and a main control unit 5.

The conveying unit 4 conveys the head suspension 200, which is temporarily fixed to a stage 7, along the load measuring unit 1, attitude angle measuring unit 2, and laser marker 3 and positions the head suspension 200 under each of the units 1, 2, and 3. The stage 7 is moved by a servo motor 8, a ball screw 9, and a linear guide 10.

The head suspension 200 is temporarily fixed to the stage 7 by, for example, holding the same with a jig 11 on the stage 7 as indicated with a dotted line in FIG. 3. Any other means such as a suction unit, a bolt, a magnet, or the like is usable to temporarily fix the head suspension 200 to the stage 7.

The stage 7 and temporarily fixing unit (11) are driven under the control of a drive controller (not shown) that is connected to and controlled by the main control unit 5.

The load measuring unit 1 includes a probe 12 and a load cell 13 attached to the probe 12. The probe 12 applies a predetermined pressure to press a specific part of the head suspension 200. The probe 12 is vertically moved by a combination of a serve motor (or stepping motor) 14 and a ball screw 15. The servo motor 14 is provided with a linear guide.

The vertical movement of the probe 12 may be carried out by an actuator employing a hydraulic cylinder.

The probe 12 has a front end 12a that is substantially spherical and is pushed under a predetermined pressure to a magnetic head mounting part (to be explained later) of the head suspension 200. At this time, the load cell 13 outputs a voltage signal to the main control unit 5. Based on the voltage signal, the main control unit 5 calculates a load of the head suspension 200.

The attitude angle measuring unit 2 includes a laser source 16 and a photoreceiver 19. The laser source 16 emits a laser beam toward an objective part such as the magnetic head mounting part of the head suspension 200. The laser source 16 may be a semiconductor laser, a YAG laser, a carbon dioxide laser, or the like. Laser emitting conditions are dependent on the material and other properties of the objective part of the head suspension 200. To achieve the present invention, proper laser emitting conditions must be set according to the material and other properties of the head suspension 200.

The photoreceiver 19 includes a CCD 17 to receive the laser beam reflected by the objective part such as the magnetic head mounting part of the head suspension 200 and a signal amplifier (AMP) 18. A signal from the CCD 17 is transmitted through the amplifier 18 to the main control unit 5, which calculates an attitude angle of the head suspension 200 according to the signal.

The load measuring unit 1 and attitude angle measuring unit 2 are positioned upstream from the laser marker 3 in a process flow.

The laser marker 3 is a standard laser marker that emits a laser beam to an object, to evaporate, reform, or color-change the surface of the object with heat of the laser beam, so that the laser irradiated part of the object may provide a different view compared with the remaining part of the object.

The laser marker 3 installed in the head suspension correcting apparatus 100 employed for the present invention is a standard laser marker.

Namely, the apparatus 100 can employ applications belonging to the laser marker 3 when correcting the head suspension 200 with a laser beam.

The apparatus 100 selects proper ones from among characters, graphical marks, and symbols originally provided for the laser marker 3, or combinations thereof and draws the selected ones on the head suspension 200 with a laser beam, to correct the load and attitude angle of the head suspension 200.

The laser marker 3 includes a laser marker head 20 and a laser marker body 6 that is connected through a light guide 21 such as an optical fiber to the laser marker head 20. The laser marker body 6 oscillates and emits a laser beam, which is transmitted through the light guide 21 to the laser marker head 20 that emits the laser beam toward the head suspension 200.

In the laser marker head 20, a galvano-scanner mirror 22 deflects the laser beam in an X-Y direction and a condenser lens 23 properly adjusts the energy density distribution of the laser beam. The deflected and adjusted laser beam is emitted toward the head suspension 200.

The laser marker body 6 incorporates a laser oscillator 24 and an oscillation controller 25. The laser oscillator 24 excites an oscillation medium such as YAG with a flash lamp, a laser diode, or the like, to emit a laser beam.

The oscillation controller 25 synchronizes the laser oscillation with the operation of the mirror 22 and controls the laser marker head 20 so that the laser beam is emitted to an objective part defined on the head suspension 200. The laser oscillator 24 may employ a single-mode laser that can reduce the diameter of a laser spot. With the single-mode laser, the oscillation controller 25 can correctly emit a laser beam to a target part on the head suspension 200 even if the target part is located in a narrow space between wires of the head suspension 200.

The condenser lens 23 may have a long focal distance to provide a deep focal depth. This may minimize a change in energy density at a laser beam irradiated part of the head suspension 200 even if the distance between the laser marker head 20 and the head suspension 200 slightly varies.

In this case, there will be no need of conducting precise focal length control that must be carried out according to a related art when the distance between the laser marker head 20 and the head suspension 200 varies.

The main control unit 5 determines a load correcting character to be drawn with a laser beam and an attitude angle correcting character to be drawn with a laser beam and generates character codes representing the determined characters.

As shown in FIG. 2, the main control unit 5 includes a load memory 51, a load calculator 52, a load database 53, and a load character selector 54.

The load memory 51 stores a load prescribed to the head suspension 200. The load calculator 52 calculates a load adjustment value according to the prescribed load and the output signal from the load measuring unit 1. The load database 53 stores a combination of load characters for each load. The load character selector 54 selects, from among the data stored in the load database 53, an optimum combination of load characters according to the load adjustment value calculated by the load calculator 52, the optimum combination of load characters being used to properly correct the load of the head suspension 200.

The main control unit 5 also includes an attitude angle memory 55, an attitude angle calculator 56, an attitude angle database 57, and an attitude angle character selector 58.

The attitude angle memory 55 stores an attitude angle prescribed to the head suspension 200. The attitude angle calculator 56 calculates an attitude angle adjustment value according to the prescribed attitude angle and the output signal from the attitude angle measuring unit 2. The attitude angle database 57 stores a combination of attitude angle characters for each attitude angle. The attitude angle character selector 58 selects, from among the data stored in the attitude angle database 57, an optimum combination of attitude angle characters according to the attitude angle adjustment value calculated by the attitude angle calculator 56, the optimum combination of attitude angle characters being used to properly correct the attitude angle of the head suspension 200.

The main control unit 5 also includes an adder 59. The adder 59 adds the load character combination selected by the load character selector 54 and the attitude angle combination selected by the attitude angle character selector 58 to each other. The adder 59 then sends a character code representing the sum of the character combinations to the laser marker 3.

The functional blocks of the main control unit 5 shown in FIG. 2 are realized by hardware such as a CPU and memories and software.

The laser marker 3 emits a laser beam to the head suspension 200 according to the character code sent from the main control unit 5. For this, the oscillation controller 25 of the laser marker 3 includes a character code memory 61, a character converter 62, and an irradiation position converter 63.

The character code memory 61 stores character codes and corresponding irradiation patterns. The character converter 62 decodes the character code sent from the adder 59 into an irradiation pattern according to the data stored in the character code memory 61.

The irradiation pattern is a character shape, a graphical shape, a symbolic shape, or the like to be drawn on the surface of an objective part of the head suspension 200 with a laser beam or with laser beam spots.

The irradiation position converter 63 converts the irradiation pattern converted by the character converter 62 into data representing positions and shapes on the head suspension 200 to be irradiated with a laser beam. This data is sent to the laser marker head 20.

The functional blocks of the oscillation controller 25 shown in FIG. 2 are realized by hardware such as a CPU and memories and software.

The head suspension 200 to be bent and corrected by the head suspension correcting apparatus 100 will be explained.

Figure 4:
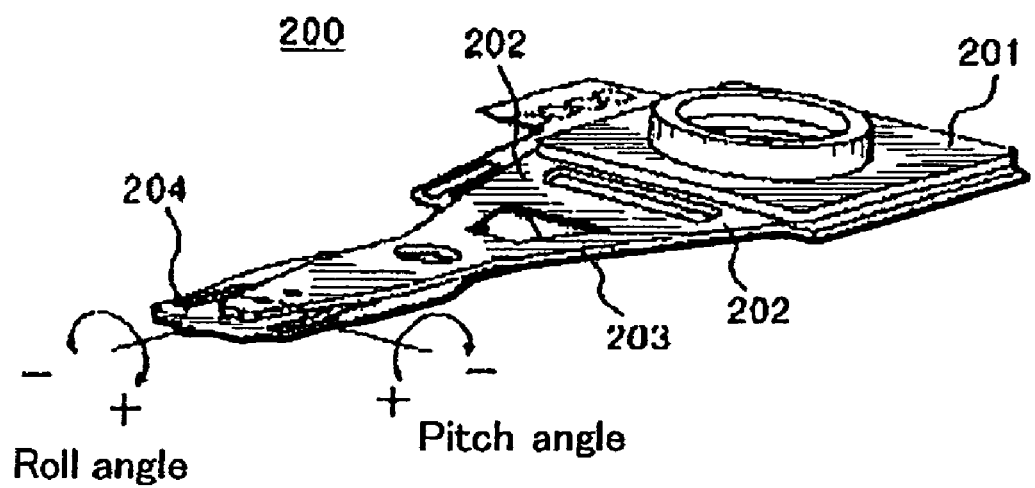
FIG. 4 is a perspective view showing a head suspension to be corrected according to the present invention.
Figure 5:
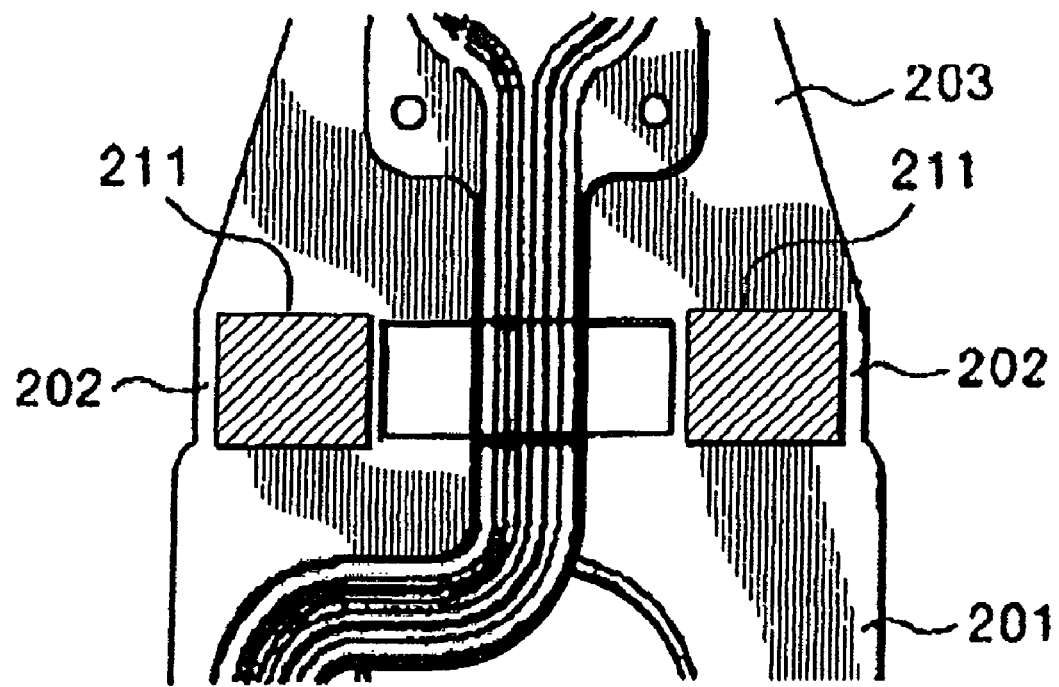
FIG. 5 is an explanatory view showing a laser beam irradiation area defined on a load producing bend of a head suspension according to an embodiment of the present invention.
Figure 6:
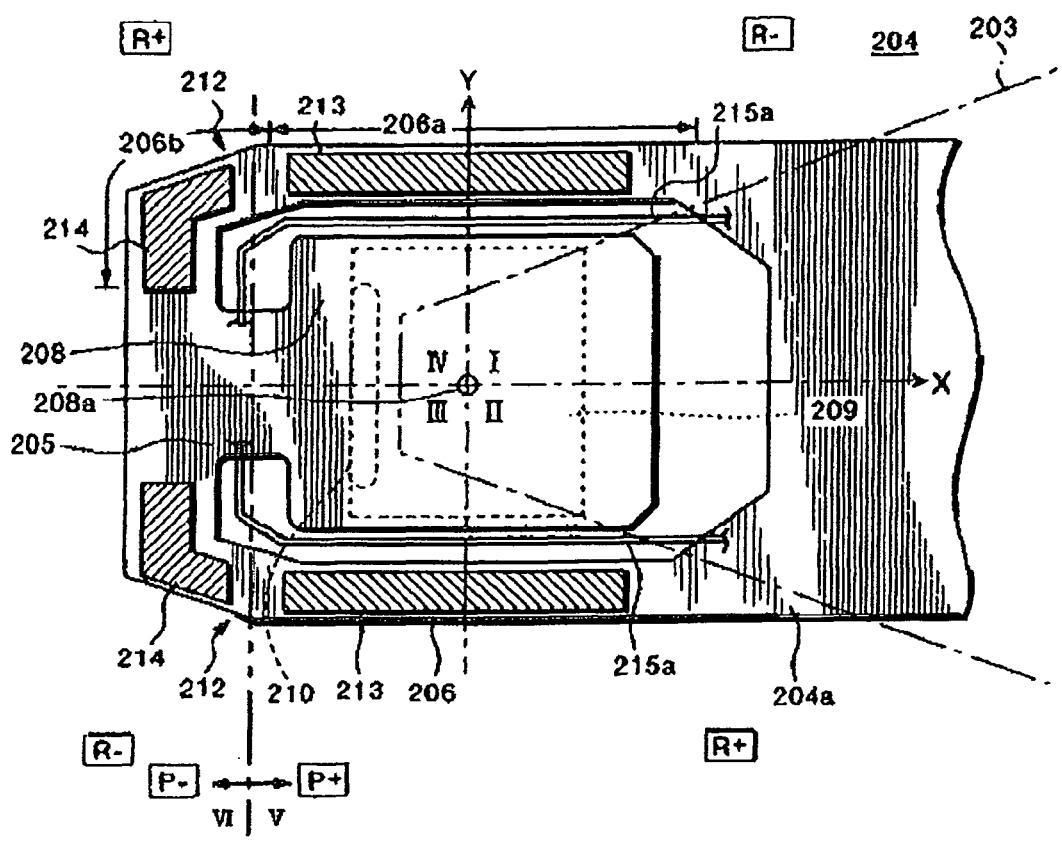
FIG. 6 is an explanatory view showing laser beam irradiation areas defined on an attitude angle adjusting part of a head suspension according to the embodiment of FIG. 5.
Figure 7:
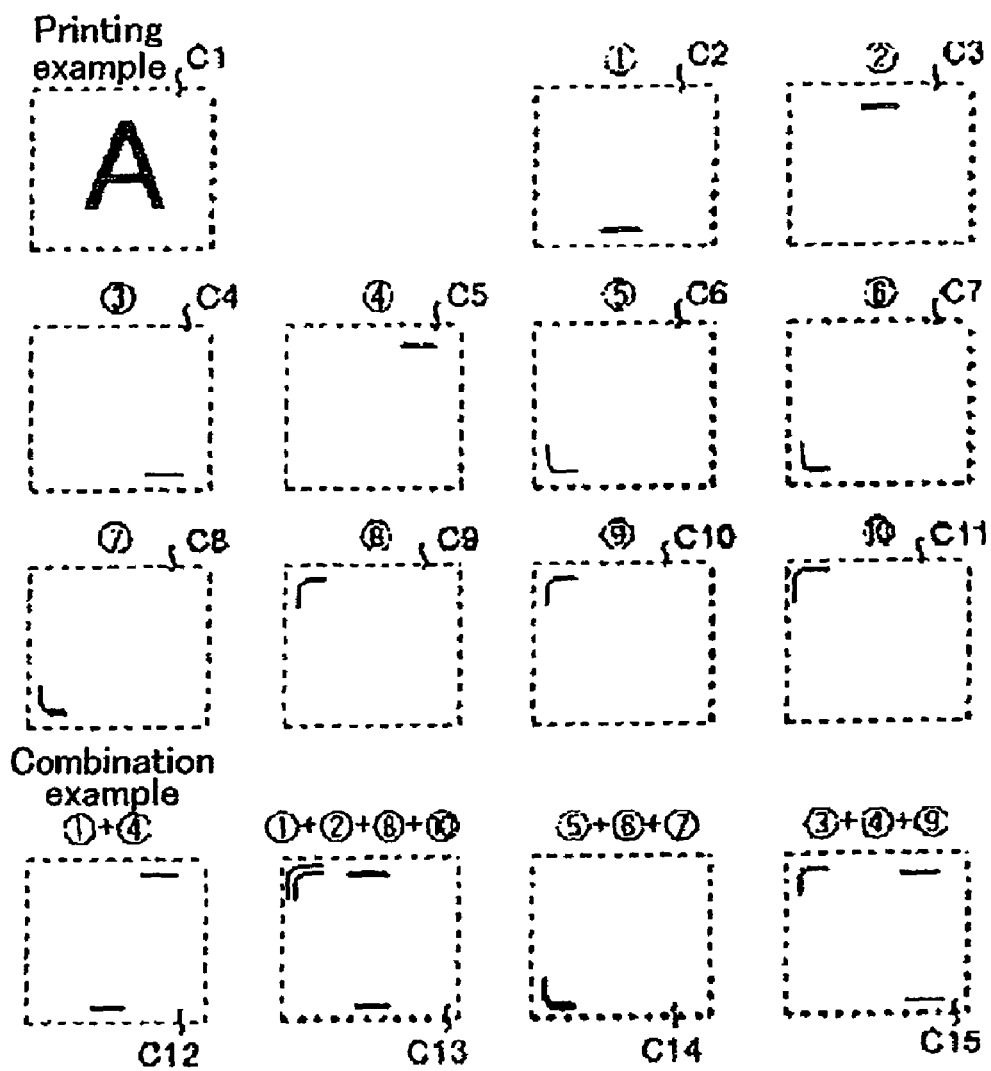
FIG. 7 is an explanatory view showing examples of characters corresponding to laser beam irradiation patterns according to an embodiment of the present invention.

FIG. 4 is a perspective view showing the head suspension 200 to be corrected, FIG. 5 is an explanatory view showing a laser beam irradiation area defined on a load producing bend of the head suspension 200, FIG. 6 is an explanatory view showing laser beam irradiation areas defined on an attitude angle adjusting part of the head suspension 200, and FIG. 7 is an explanatory view showing examples of characters corresponding to laser beam irradiation patterns.

In FIG. 4, the head suspension 200 has a base plate 201, the load producing bend 202, and a load beam 203 connected to the base plate 201 with the load producing bend 202. The load beam 203 is made of a precision thin plate spring and functions to apply a load onto a magnetic head 209 to be explained later. The load beam 203 is made from a metal plate (having a thickness in the range of several tens of micrometers to a hundred micrometers) such as an austenite-based stainless steel plate according to Japanese Industrial Standard SUS304 or SUS305. A flexure 204 is fixed to a front end of the load beam 203 by spot-welding.

As shown in FIG. 6, the flexure 204 has a gimbal spring 205, an outrigger 206, and a magnetic head mount 208. The flexure 204 is fixed to the load beam 203 through a fitting part. The magnetic head mount 208 is in contact with a dimple 208a formed at a front end of the load beam 203. When the magnetic head 209 is mounted on the magnetic head mount 208, the dimple 208a is positioned substantially at the center of the magnetic head 209.

The flexure 204 is formed by etching or punching a stainless steel plate into a predetermined shape. The magnetic head 209 is mounted on the magnetic head mount 208 and is provided with a magnetic head element 210 at an end of the magnetic head 209, as indicated with a dotted line in FIG. 6.

The base plate 201 and load beam 203 may be formed integrally, or may be formed separately and joined together by spot-welding. The load beam 203 and load producing bend 202 may be formed integrally and the load producing bend 202 may partly or entirely be thinned by etching. The load producing bend 202 may separately be formed, fixed to the load beam 203, and attached to the base plate 201 by spot-welding.

The load producing bend 202 is bent beforehand in a pitch direction (FIG. 4) by, for example, pressing, to apply a proper load onto the magnetic head mount 208.

As mentioned above, the bending of the head suspension 200 is mechanically carried out, and therefore, the load applied to the magnetic head mount 208 must be corrected later to a specified value. The head suspension 200 must further be corrected so that the magnetic head mount 208 may face a disk in a hard disk drive at a proper attitude angle.

In each of these steps or stages, a method of correcting a head suspension according to an embodiment of the present invention is carried out, as will be explained later.

As shown in FIGS. 4 and 5, the load producing bend 202 includes, for example, a pair of legs extending between the base plate 201 and the load beam 203. The load producing bend 202 may be thinned, if required.

On the load producing bend 202, an irradiation area 211 is defined. The irradiation area 211 is an objective part that is irradiated with a laser beam to correct the head suspension 200 due to bending.

The head suspension 200 is irradiated with a laser beam within the irradiation area 211 according to a calculated length and shape, as will be explained later in detail. In the irradiation area 211 defined on the load producing bend 202, a length to be irradiated with a laser beam is selected from, for example, four kinds of lengths according to the degree of correction (load adjusting quantity).

The irradiation areas 211 are disposed left-right symmetrically, the head suspension 200 will bend in a pitch direction (FIG. 4).

On the flexure 204, there are defined irradiation areas 213 and 214 as shown in FIG. 6. The irradiation areas 213 and 214 form an attitude angle adjusting part 212 that is an objective part of the head suspension 200 to be irradiated with a laser beam. The irradiation area 213 is defined on a straight part 206a extending from a base 204a of the outrigger 206. The irradiation area 214 is defined at a curve 206b between the straight part 206a and the gimbal spring 205.

Correcting the irradiation areas 213 and 214 with a laser beam results in correcting the roll and pitch angles (attitude angle) of the head suspension 200 (FIG. 4).

To explain the correction of the roll and pitch angles of the head suspension 200, X and Y axes are set to pass the center (generally, the position of the dimple 208a) of the magnetic head mount 208, and around the X and Y axes, zones I to IV are defined. Irradiating the zones I to IV with a laser beam results in correcting the roll angle of the head suspension 200.

More precisely, irradiating the zones II and III on the outrigger 206 with a laser beam results in correcting the roll angle of the head suspension 200 in a negative (−) direction and irradiating the zones I and IV on the outrigger 206 with a laser beam results in correcting the roll angle of the head suspension 200 in a positive (+) direction, as shown in FIG. 4.

A center line passing the center of the gimbal spring 205 and laterally crossing the gimbal spring 205 is set to define zones V (first zone) and VI (second zone). Irradiating the zone V with a laser beam results in correcting the pitch angle of the head suspension 200 in a positive (+) direction and irradiating the zone VI with a laser beam results in correcting the pitch angle of the head suspension 200 in a negative (−) direction, as shown in FIG. 4.

Combining the above-mentioned corrections results in correcting the roll and pitch angles of the head suspension 200 to specified values.

The head suspension 200 shown in FIGS. 4 to 6 is only an example. Any head suspension (or any thin plate) having any shape is correctable according to the present invention by properly defining an irradiation area at a location of the head suspension that controls the load and attitude angle of the head suspension and by irradiating the irradiation area with a laser beam. The shape and other characteristics of the irradiation area are determined according to the shape, material, and other conditions of the head suspension.

Each head suspension may have a different irradiation area having a specific shape and other characteristics. The shape, position, and other characteristics of an irradiation area to be defined on a given head suspension are empirically determined or are simulated by computer.

In FIG. 6, the irradiation areas (irradiation objective parts) 213 and 214 are determined not to overlap a wiring area 215a between the outrigger 206 and the magnetic head mount 208. The wiring area 215a includes, for example, a flexible substrate including copper wires and insulating layers. In practice, the wiring area 215a is spatially spaced away from the outrigger 206.

The wiring area 215a must not be irradiated with a laser beam. If the wiring area 215a is irradiated with a laser beam, the cupper wires will be cut or the flexible substrate will burn.

To avoid this, the present invention defines the irradiation areas 213 and 214 out of the wiring area 215a, so that the wiring area 215a will not be irradiated with a laser beam and the copper wires will not be cut with a laser beam.

When an objective part defined on the head suspension 200 is irradiated with a laser beam, thermal deformation occurs at the objective part to correct the load and attitude angle of the head suspension 200. Before achieving this, an amount of thermal deformation to occur must be estimated for each of the irradiation areas 211, 213, and 214 and must be stored in a database.

When a laser beam is emitted for a given interval to draw a pattern in one of the irradiation areas 211, 213, and 214, the load producing bend 202 or the attitude angle adjusting part 212 deforms. A relationship between the laser beam irradiation pattern and the deformation must be measured by test or simulation and must be stored in a database.

An example of such data stored in a database is a character representative of a shape to be drawn on the head suspension 200 with a laser beam to correct the load or attitude angle of the head suspension 200. Each character stored in the database specifies a shape or a pattern to be drawn with a laser beam in an objective part of the head suspension 200, the pattern drawn with a laser beam corresponding to a load adjustment amount or an attitude angle adjustment amount. The database corresponds to the load database 53 and attitude angle database 57 prepared in the main control unit 5.

FIG. 7 shows examples of irradiation patterns or characters stored in the laser marker 3. A character C1 is an irradiation pattern (alphabet) used in standard use of the laser marker 3. Characters C2 to C11 are irradiation patterns used for correcting the load and attitude angle of the head suspension 200. For example, the character C2 is used to draw a segment with a laser beam at a lower central location in a predetermined frame and the character C3 is used to draw a segment with a laser beam at an upper central location in the predetermined frame. Similarly, the characters C4 to C11 are used to draw patterns at predetermined locations in the predetermined frame.

Characters C12 to C15 each represent a combination of characters. For example, the character C12 is a combination of the characters C2 and C5 used to correct the load and attitude angle of the head suspension 200. Similarly, the characters C13 to C15 are character combinations used to correct the load and attitude angle of the head suspension 200.

In practice, many character combinations are prepared to entirely cover required ranges of load and attitude angle adjustments.

When a character combination is selected to correct, for example, the roll angle (pitch angle) of the head suspension 200, the correction unavoidably affects the pitch angle (roll angle) of the head suspension 200. Namely, it is impossible to correct the roll angle or the pitch angle alone with a single character.

Accordingly, a practical correction of the head suspension 200 is carried out by properly combining characters.

Character combinations are represented with codes and are stored in the load database 53 and attitude angle database 57. The load character selector 54 selects a proper character combination for adjusting the load of the head suspension 200 and the attitude angle character selector 58 selects a proper character combination for adjusting the attitude angle of the head suspension 200. The selected character combinations are added to each other in the adder 59, which provides a character code representing the resultant sum. The character code is converted by the character converter 62 into positional data according to the data stored in the character code memory 61. The positional data is converted by the irradiation position converter 63 into irradiation position data.

A method of correcting a head suspension (or a thin plate) according to an embodiment of the present invention will be explained in detail with reference to FIGS. 8, 9(1), and 9(2).

Figure 8:
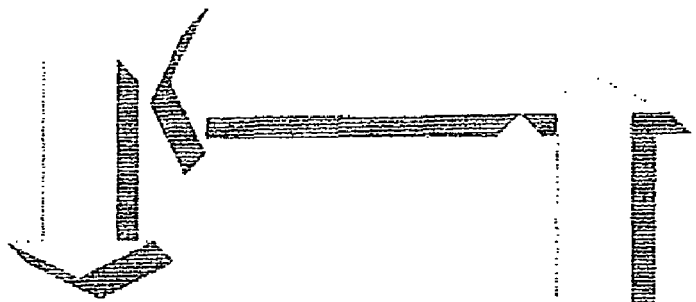
FIG. 8 is an explanatory view showing a method of correcting a head suspension according to an embodiment of the present invention.
Figure 8:
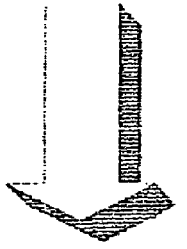
Figure 8:
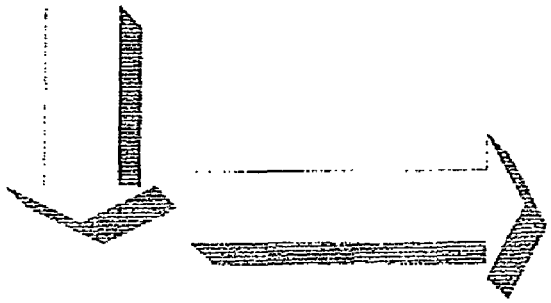

FIG. 8 is an explanatory view showing a method of correcting a head suspension according to an embodiment of the present invention and FIGS. 9(1) and 9(2) are explanatory views showing an example of correcting a head suspension according to the embodiment.

The load and attitude angle of the head suspension 200 or of a thin plate are corrected by irradiating an objective part, for example, any one of the irradiation areas 211, 213, and 214 defined on the head suspension 200 with a laser beam. It is sometimes required to repeat such correction a plurality of times.

If a laser beam of this time of correction traces an irradiation history of the last time of correction when correcting the head suspension 200 a plurality of times, the load and attitude angle of the head suspension 200 will not precisely be corrected due to residual thermal stress, as explained above.

Namely, any part already heated with a laser beam shows little change in internal stress when irradiated with a laser beam second time. Then, a bend of the head suspension 200 produced by the laser beam of the second time will be smaller than an intended bend. This is the reason why an error occurs when the head suspension 200 is corrected a plurality of times.

The head suspension 200 is a very fine product, and in some cases, it is difficult to change an irradiation location every time when correcting the head suspension 200 with a laser beam. In this case, it is unavoidable to repeatedly correct the same part of the head suspension 200 by laser irradiation.

The head suspension correcting method according to the embodiment is capable of precisely correcting the head suspension 200 even when correcting the head suspension 200 a plurality of times.

The embodiment corrects the head suspension 200 having the base plate 201, load beam 203, and flexure 204 by irradiating an objective part such as the irradiation area 213 (FIG. 6) defined on the outrigger 206 of the head suspension 200 with a laser beam before or after mounting a read/write head on the head suspension 200. The heat of the laser beam at the objective part bends the head suspension 200, thereby correcting the load and attitude angle of the head suspension 200.

When correcting the head suspension 200 a plurality of times, the embodiment of FIG. 8 carries out a heating process (second step) to remove residual stress from the head suspension 200 after finishing a correction process (first step) and before starting the next correction process (first step).

The heating process may be a conventional heating process. For example, the heating process puts the head suspension 200 in a low-temperature gas atmosphere furnace (not shown), closes the door of the furnace, and replaces the inside of the furnace with an inert gas atmosphere. Thereafter, the heating process heats the head suspension 200 at a predetermined temperature for a predetermined time.

The heating process removes residual stress created by the preceding correction process from the head suspension 200, so that an irradiation history of the preceding correction process is canceled and the next correction process will be carried out without an irradiation history of the preceding correction process.

Namely, the next correction process will correctly be carried out even if it traces, with a laser beam, the same part of the head suspension 200 that has already been irradiated with a laser beam in the preceding correction process.

This technique eliminates the need of examining whether or not a part to be corrected on the head suspension 200 has once been corrected. This improves the degree of freedom when determining a position to be corrected on the head suspension 200.

It is preferable to carry out the heating process in an inert gas atmosphere, to prevent the material of the head suspension 200 from being oxidized.

The inert gas is, for example, a nitrogen gas or a gas of a noble element belonging to the 18th group in the long-form periodic table, such as helium, neon, argon, krypton, xenon, radon, and ununoctium. Heating the head suspension 200 in an inert gas atmosphere effectively prevents the material of the head suspension 200 from being oxidized and properly removes residual stress from the head suspension 200.

An example of the correction process (first step) of FIG. 8 that irradiates the head suspension 200 with a laser beam to correct the head suspension 200 due to bending will be explained with reference to FIGS. 9(1) and 9(2).

In FIG. 9(1), the correction process of FIG. 8 intermittently emits a laser beam to an objective part 301 of the head suspension 200 linearly along a straight line extending in a predetermined direction, which is a longitudinal direction of the objective part 301 and is indicated with a continuous arrow. The intermittent laser beam emission forms an irradiation history 303 of irradiation spots on the surface of the objective part 301.

FIG. 9(2) shows the details of the irradiation history 303. The irradiation history 303 consists of seven irradiation spots 307a to 307g that are aligned at regular intervals along a center line 305. The number of the irradiation spots may be optional. Adjacent ones of the irradiation spots 307a to 307g partly overlap each other, to form overlapping parts 309a to 309f.

The overlapping parts 309a to 309f cause no correction error, according to the embodiment.

This is because the embodiment sets laser irradiation conditions so that a central part of each irradiation spot has a higher irradiation energy density and a peripheral part (the overlapping part) thereof has a lower irradiation energy density.

The present invention may employ other laser irradiation conditions. For example, the peripheral part of each irradiation spot may also have a high irradiation energy density. In this case, it is preferable to form irradiation spots so that adjacent irradiation spots may not overlap each other.

An interval between adjacent irradiation spots is optional. For example, the irradiation spots 307a to 307g may be formed at relatively wide intervals without creating the overlapping parts 309a to 309f. It is also possible to form the irradiation spots 307a to 307g at irregular intervals.

A method of processing a thin plate according to an embodiment of the present invention is based on the head suspension correcting method of the above-mentioned embodiment of the present invention. Namely, the thin plate processing method bends a beam-shaped thin plate by irradiating the thin plate with a laser beam. If the thin plate must be bent again, the method removes residual stress from the thin plate by heating the thins plate, and then, again bends the thin plate by irradiating the thin plate with a laser beam.

Removing residual stress from the thin plate before repeating the bending process results in erasing the irradiation history of the preceding process.

Even if the next bending process traces with a laser beam the same part where the preceding bending process has irradiated with a laser beam, the next bending process will precisely be carried out because the part has no residual stress of the preceding bending process.

The "irradiation history" is a trace formed by a laser beam on an objective part of a thin plate or of a head suspension.

The irradiation history may be visible or invisible on the surface of the objective part. The irradiation history may be a stress history that is formed by heat of a laser beam and is invisible on the objective part.

Once the objective part is irradiated with a laser beam, the objective part is considered to have an irradiation history without regard to whether the irradiation history is visible or invisible from the appearance of the objective part.

The irradiation history consists of spots or a trace made by laser irradiation to correct the thin plate (head suspension) due to bending. The irradiation spots or the trace are confirmable or not confirmable from the appearance of the thin plate (head suspension).

The head suspension correcting method according to the embodiment removes residual stress created by the preceding correction process from the head suspension 200, and then, carries out the next correction process.

The method can correctly carry out the correction process even if the correction process traces, with a laser beam, the same part of the head suspension that has been irradiated with a laser beam in the preceding correction process.

The method eliminates the need of examining whether or not a part to be corrected on the head suspension has once been corrected. This improves the degree of freedom when determining a correcting location on the head suspension.

The method carries out the heating process of the head suspension in an inert gas atmosphere, to prevent the material of the head suspension from being oxidized, so that residual stress is properly removed from the head suspension.

A method of manufacturing a head suspension according to an embodiment of the present invention employs the head suspension correcting method of the above-mentioned embodiment. The head suspension thus manufactured has a precisely adjusted load and attitude angle.

In addition, the head suspension thus manufactured can properly control the attitude of a magnetic head mounted on the head suspension.

The method of processing a thin plate based on the above-mentioned head suspension correcting method removes residual stress created by a preceding bending process before starting a succeeding bending process.

Even if the succeeding bending process traces with a laser beam the same part where the preceding bending process has irradiated with a laser beam, the succeeding bending process will precisely be carried out.

The present invention is not limited to the embodiments and examples mentioned above. The embodiments and examples may be modified without departing from the gist and technical idea of the present invention stipulated in the claims and specification. Head suspension correcting methods, head suspension manufacturing methods, head suspensions, and thin plate processing methods based on such modifications are also within the scope of the present invention.

For example, although the laser marker 3 employed by the present invention is a standard laser marker available in the market, the present invention may employ any laser emitting apparatus if the apparatus is capable of achieving the embodiments and examples of the present invention.

Although each of the above-mentioned embodiments and examples simultaneously conducts a load adjustment and an attitude angle adjustment, it is possible to conduct only one of the adjustments. In this case, a character combination to be used for the adjustment is properly selected according to a load adjustment amount or an attitude angle adjustment amount that is obtained beforehand.

A general practice of correcting an attitude angle is performed by changing laser power. This practice of changing laser power may be combined with the present invention.

The present invention is applicable to correct a head suspension that has once been corrected and already assembled with a magnetic head into a head gimbal assembly.

The present invention is also applicable to a head suspension provided with a magnetic head. After a head suspension and a magnetic head are assembled into a head gimbal assembly, various tests are carried out. If the tests find an error in the magnetic head, the magnetic head must be replaced with another and the head gimbal assembly must be reassembled. In this case, the head gimbal assembly itself can be corrected according to the embodiments and examples of the present invention, by replacing the wording "head suspension" with "head gimbal assembly."

What is claimed is:

1. A method of correcting a head suspension before or after mounting a read/write head on the head suspension, comprising:

repeating a correction process of correcting a posture of the head suspension due to bending a plurality of times, wherein repeated correction processes are performed, each of an initial and the repeated correction processes irradiating the head suspension with a laser beam to generate inner stress at an irradiated portion so that a bend is produced by inner stress on the head suspension to alter the posture of the head suspension, and wherein during each repeated correction process the laser beam traces an area of the head suspension that at least partially overlaps with an area that was irradiated by the laser beam in a preceding correction process; and removing residual stress from the head suspension between each correction process.

2. The method of claim 1, wherein:

wherein the repeated correction processes comprise irradiating a portion of the head suspension within a defined area less than an entirety of the head suspension;

said removing of residual stress is carried out by heat-treating head suspension.

3. The method of claim 2, wherein:

heat-treating the head suspension is carried out in an inert gas atmosphere.

4. A method of manufacturing a head suspension, comprising:

correcting the head suspension according to the method of claim 1.

5. A method of manufacturing a head suspension, comprising:

correcting the head suspension according to the method of claim 2.

6. A method of manufacturing a head suspension, comprising:
   correcting the head suspension according to the method of claim 3.

7. A method of correcting load and attitude angle of a head suspension before or after mounting a read/write head on the head suspension, comprising:
   irradiating a portion of the head suspension with a laser beam to generate inner stress at the irradiated portion and produce a bend for altering either one or both of the load and attitude angle;
   after said irradiating, heating the head suspension to remove residual stress; and
   iteratively repeating the irradiating and heating so that for each subsequent irradiation there was a preceding heating and a preceding irradiation, and wherein for each subsequent irradiation, the laser beam traces an area of the head suspension that at least partially overlaps with an area that was irradiated by the laser beam in said subsequent irradiation's preceding irradiation.

8. The method of claim 7, wherein said heating comprising heating the head suspension in an oven with an inert gas atmosphere.

* * * * *